(12) United States Patent
Takizawa et al.

(10) Patent No.: US 10,672,110 B2
(45) Date of Patent: Jun. 2, 2020

(54) INFORMATION PROCESSING SYSTEM, INFORMATION PROCESSING APPARATUS, OUTPUT APPARATUS, PROGRAM, AND RECORDING MEDIUM

(71) Applicant: Sony Interactive Entertainment Inc., Tokyo (JP)

(72) Inventors: Atsushi Takizawa, Saitama (JP); Takamasa Araki, Tokyo (JP); Rei Miyazaki, Tokyo (JP); Shotaro Tada, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/753,118

(22) PCT Filed: May 19, 2016

(86) PCT No.: PCT/JP2016/064870
§ 371 (c)(1),
(2) Date: Feb. 15, 2018

(87) PCT Pub. No.: WO2017/043126
PCT Pub. Date: Mar. 16, 2017

(65) Prior Publication Data
US 2018/0247392 A1     Aug. 30, 2018

(30) Foreign Application Priority Data

Sep. 7, 2015 (JP) .................................. 2015-175862

(51) Int. Cl.
*G06T 5/00* (2006.01)
*H04N 5/64* (2006.01)
(Continued)

(52) U.S. Cl.
CPC ............ *G06T 5/006* (2013.01); *G02B 27/017* (2013.01); *H04N 5/64* (2013.01); *H04N 5/66* (2013.01);
(Continued)

(58) Field of Classification Search
CPC . G06T 5/006; G09G 5/00; G09G 5/38; H04N 5/64; H04N 5/66; G02B 27/02
(Continued)

(56) References Cited

U.S. PATENT DOCUMENTS

| 6,356,300 B1 | 3/2002 | Shiba |
| 8,159,495 B2 | 4/2012 | Carter-Schwendler |

(Continued)

FOREIGN PATENT DOCUMENTS

| CN | 101467140 A | 6/2009 |
| CN | 101726854 A | 6/2010 |

(Continued)

OTHER PUBLICATIONS

International Search Report for related PCT Application No. PCT/JP2016/064869, 4 pages, dated Aug. 16, 2016.
(Continued)

*Primary Examiner* — Amare Mengistu
*Assistant Examiner* — Gloryvid Figueroa-Gibson
(74) *Attorney, Agent, or Firm* — Matthew B. Dernier, Esq.

(57) ABSTRACT

To solve a problem that when there is an error in a mounting position in mounting a lens and thus an optical axis of the lens and a center of a display is shifted, centers of images seen by the left and right eyes of a user individually, are shifted and thus an intended sense of distance cannot be presented to the user. An output apparatus includes a display portion including a plurality of sub-pixels every pixel, and a lens arranged on a display surface side of the display (Continued)

portion, and outputs information on an assembly error representing position shift between an optical axis of the lens and a center of the display portion. An information processing apparatus produces corrected image data obtained by correcting image data becoming an object of display based on the information on the assembly error output from the output apparatus.

5 Claims, 5 Drawing Sheets

(51) Int. Cl.
  H04N 5/66      (2006.01)
  G02B 27/01     (2006.01)
  G02B 27/02     (2006.01)
(52) U.S. Cl.
  CPC ........ G02B 27/02 (2013.01); G02B 2027/011 (2013.01); G02B 2027/014 (2013.01)
(58) Field of Classification Search
  USPC .......................................................... 345/8
  See application file for complete search history.

(56) References Cited

U.S. PATENT DOCUMENTS

| | | | |
|---|---|---|---|
| 8,836,720 | B2 | 9/2014 | Oyama |
| 9,628,766 | B2 | 4/2017 | Tamayama |
| 9,740,007 | B2 | 8/2017 | Ikeda |
| 2007/0279418 | A1 | 12/2007 | Carter-Schwendler |
| 2010/0097502 | A1 | 4/2010 | Hagiwara |
| 2013/0241947 | A1 | 9/2013 | Hirota |
| 2013/0278497 | A1 | 10/2013 | Takagi et al. |
| 2014/0327604 | A1 | 11/2014 | Oyama |
| 2015/0009416 | A1 | 1/2015 | Tamayama |
| 2015/0219902 | A1* | 8/2015 | Kim ................... G02B 27/0179 345/8 |
| 2015/0304527 | A1 | 10/2015 | Chou |
| 2017/0315363 | A1 | 11/2017 | Ikeda |

FOREIGN PATENT DOCUMENTS

| | | |
|---|---|---|
| CN | 102053367 A | 5/2011 |
| CN | 103313079 A | 9/2013 |
| CN | 10354748 A | 1/2014 |
| CN | 104115491 A | 10/2014 |
| EP | 2688060 A1 | 1/2014 |
| JP | 2001147486 A | 5/2001 |
| JP | 2004233869 A | 8/2004 |
| JP | 2009049831 A | 3/2009 |
| JP | 2009540359 A | 11/2009 |
| JP | 2010019987 A | 1/2010 |
| JP | 2010103886 A | 5/2010 |
| JP | 2010230898 A | 10/2010 |
| JP | 2011139158 A | 7/2011 |
| JP | 2013225042 A | 10/2013 |
| KR | 100341149 B1 | 2/2020 |

OTHER PUBLICATIONS

International Preliminary Report on Patentability and Written Opinion for corresponding PCT Application No. PCT/JP2016/064870, 11 pages, dated Mar. 22, 2018.
International Preliminary Report on Patentability and Written Opinion for related PCT Application No. PCT/JP2016/064869, 13 pages, dated Mar. 22, 2018.
International Search Report for corresponding PCT Application No. PCT/JP2016/064870, 2 pages, dated Aug. 16, 2016.
Extended European Search Report for related EP Patent Application No. 16843991.7, 9 pages, dated Dec. 10, 2018.
Office Action for corresponding JP Patent Application No. 2017-538886, 8 pages, dated Oct. 2, 2018.
Extended European Search Report for corresponding EP Patent Application No. 16843992.5, 12 pages, dated Mar. 3, 2019.
The First Office Action for related CN Application No. 201680050436.9, 26 pages, dated Sep. 18, 2019.
The First Office Action for corresponding CN Application No. 201680050437.3, 28 pages, dated Feb. 6, 2020.
Office Action for related U.S. Appl. No. 15/753,292, 15 pages, dated Apr. 13, 2020.

* cited by examiner (a)

(b)

INFORMATION PROCESSING SYSTEM, INFORMATION PROCESSING APPARATUS, OUTPUT APPARATUS, PROGRAM, AND RECORDING MEDIUM

TECHNICAL FIELD

The present invention relates to an information processing system, an information processing apparatus, an output apparatus, a program, and a recording medium.

BACKGROUND ART

In recent years, for example, like a head-mounted display or a smart glass, there has been an output apparatus which a user mounts on his/her head to use. Such an output apparatus is provided with a pair of displays which are individually disposed in front of the left and right eyes of the user, and presents images displayed on the displays to the user. Since such an output apparatus enables the user to visually recognize a picture having realistic sensation, the output apparatus is utilized in a virtual reality technique and the like.

SUMMARY

Technical Problems

With such an output apparatus, in order to widen a viewing angle thereof, images displayed on the displays can be dared to be formed in front of the eyes of the user through lenses each having a strong distortion. When such lenses are used, the images displayed on the displays are not the images themselves presented to the user. That is to say, corrected images for which a distortion reverse to a lens distortion is previously given to the original images (source images) are produced, and the corrected images are displayed. As a result, the images which are visually recognized by the user through the lenses become ones corresponding to the source images.

However, if there was an error in mounting position when this lens was mounted at the time of manufacture, and an optical axis of the lens and the center of the display was shifted, then, the centers of the respective images which were seen by the left and right eyes of the user were shifted. Thus, there was the case where the directions of the lines of sight of the left and the right did not cross each other (becoming outward), or there was the case where the lines of sight became inward. For this reason, heretofore, there was a problem that the intended sense of distance could not be presented to the user.

The present invention has been made in the light of the actual situation described above, and one of objects thereof is to provide an information processing system, an information processing apparatus, an output apparatus, a program, and a recording medium each of which is capable of presenting an intended sense of distance to a user.

Solution to Problems

The present invention made in order to solve the problems in the past example is an information processing system having an output apparatus and an information processing apparatus. The output apparatus includes a display portion including a plurality of sub-pixels every pixel, a lens disposed on a display surface side of the display portion, and means for outputting information, on an assembly error, representing position shift between an optical axis of the lens and a center of the display portion. The information processing apparatus acquires the information on the assembly error from the output apparatus and includes corrected image data producing means, and mean for outputting second corrected image data produced by the corrected image data producing means. The corrected image data producing means produces second corrected image data which is obtained by further moving in parallel corrected image data produced by carrying out predetermined correction based on source image data becoming an object of display, based on the information on the assembly error acquired. The output apparatus displays the second corrected image data output by the information processing apparatus on the display portion.

Advantageous Effect of Invention

According to the present invention, an intended sense of distance can be presented to a user.

DESCRIPTION OF EMBODIMENT

An embodiment of the present invention will be described with reference to the drawings. An information processing system 10 according to the embodiment of the present invention, as exemplified in FIG. 1, includes an information processing apparatus 11 and an output apparatus 12.

Figure 1:
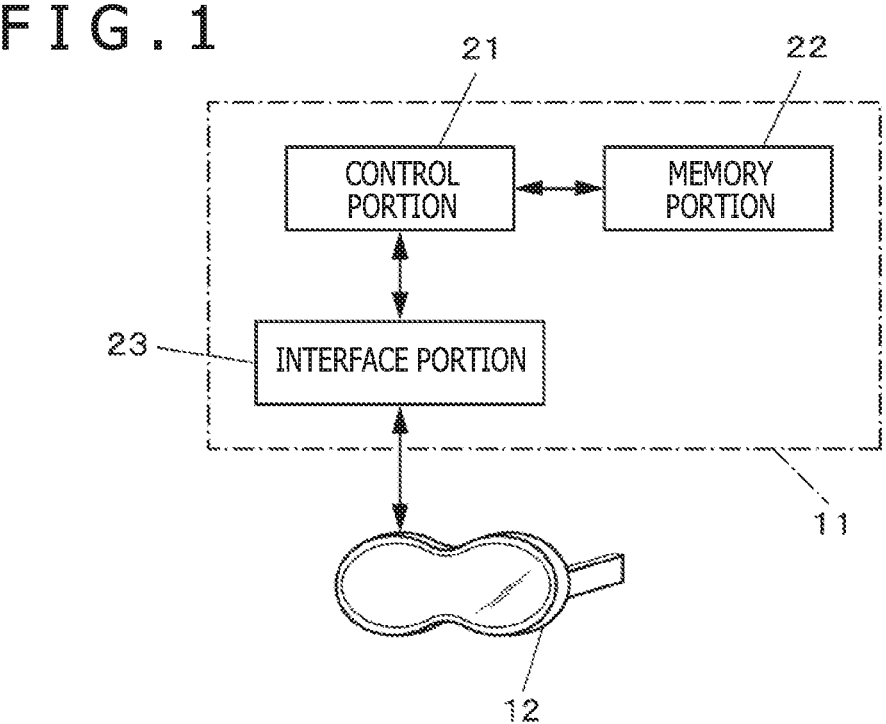
FIG. 1 is a configuration block diagram representing an example of an information processing system according to an embodiment of the present invention.

In an example of the present embodiment, the information processing apparatus 11, for example, is computer-based equipment such as a home-use video game system. Specifically, as depicted in FIG. 1, the information processing apparatus 11 includes a control portion 21, a memory portion 22, and an interface portion 23. In addition, the output apparatus 12, for example, is a head-mounted display. As schematically exemplified in FIG. 2, the output apparatus 12 includes a control portion 31, a memory portion 32, an input/output (I/O) interface portion 33, a pair of display portions 34L and 34R, and a pair of lenses 35L and 35R.

In addition, in the present embodiment, for the output apparatus 12, at the time of factory shipment, an assembly error of a pair of display portions 34L and 34R (hereinafter collectively written as the display portion 34 when it is unnecessary to make a distinction), and the lens 35 (the lens 35L on the left eye side, and the lens 35R on the right eye side) is measured. This measurement can be carried out by using the generally known method. Specifically, this measurement is carried out as follows. Firstly, after the display portions 34L and 34R on which the image for the left eye and the image for the right eye are to be individually displayed, and the lens 35 are assembled, images (markers) of a pair of line segments (crosses) crossing at a central position c of each of the display portions 34L and 34R are displayed at the centers of the respective display portions 34L and 34R.

Next, the markers displayed on the respective display portions 34L and 34R are photographed by using a camera for measurement installed in a state in which an optical axis of the camera is made to align with each of central axes A of the ideal assembly positions of the display portion 34L and the lens 35L, and the display portion 34R and the lens 35R.

Then, how much far the cross point c represented by the images of the markers thus photographed is shifted from the position corresponding to the optical axis of the camera for measurement is measured.

As a result, a shift $d(\Delta x, \Delta y)$ (represented by the coordinates of the display portion 34) between the images displayed on the corresponding display portions 34L and 34R visually recognized through the lenses 35L and 35R, and a point of view is measured. Incidentally, in this case, a row direction of the pixels is assigned an X-axis, and a direction orthogonally intersecting the X-axis is assigned a Y-axis. Then, the measurement results concerned (the measurement results about the set of lens 35L and the display portion 34L on the left eye side, and the set of lens 35R and the display portion 34R on the right eye side) are stored as information on the assembly error in the memory portion 32.

The control portion 21 of the information processing apparatus 11 is a program-controlled device such as a central processing unit (CPU) which operates in accordance with a program stored in the memory portion 22, or a graphics processing unit (GPU) as an image processing module. The control portion 21 of the present embodiment receives source image data becoming an object of display in the output apparatus 12, and produces corrected image data which is obtained by correcting a distortion of the lens 35 included in the output apparatus 12 through a predetermined conversion expression based on the source image data thus received. In addition, the control portion 21 outputs the resulting corrected image data to the output apparatus 12. An operation of the control portion 21 will be described later in detail.

The memory portion 22 is a memory device, a disc device or the like. A program which is to be executed by the control portion 21 is stored in the memory portion 22. This program may be one which is stored in a computer readable and non-transitory recording medium such as a digital versatile disc read-only memory (DVD-ROM) in order to be presented, and may be stored in the memory portion 22. In addition, the memory portion 22 may operate as a work memory as well of the control portion 21, and a frame buffer area in which image data becoming an object of processing is stored, for example, may be set in the memory portion 22.

The interface portion 23, for example, is a high-definition multimedia interface (HDMI) (registered trademark) port, a universal serial bus (USB) port or the like, and is connected to the output apparatus 12. In addition, the interface portion 23 outputs data (such as image data) to the output apparatus 12 in accordance with an instruction inputted thereto from the control portion 21. In addition, the interface portion 23 outputs information inputted thereto from the output apparatus 12 to the control portion 21.

The control portion 31 of the output apparatus 12 is a program-controlled device, such as a CPU, which operates in accordance with the program stored in the memory portion 32. In the present embodiment, the control portion 31 executes processing for outputting corrected image data which is inputted from the information processing apparatus 11 through the I/O interface portion 33 to the display portion 34. In addition, the control portion 31 may execute processing for receiving a request for the information on the assembly error stored in the memory portion 32 from the outside (such as the information processing apparatus 11), reading out the information on the requested assembly error from the memory portion 32, and sending the information on the assembly error to the information processing apparatus 11 or the like as the requestor. An operation of the control portion 31 will be described later.

The memory portion 32 is a memory device or the like, and a program which is to be executed by the control portion 31 is stored in the memory portion 32. This program may be one which is stored in a computer readable and non-transitory recording medium such as a DVD-ROM in order to be presented, and may be stored in the memory portion 32. In addition, the memory portion 32 may operate as a work memory as well of the control portion 31, and, for example, an area in which the corrected image data for display is to be stored may be set in the memory portion 32. Moreover, as previously stated in the present embodiment, the information on the assembly error which had been measured at the time of factory shipment is stored in the memory portion 32.

The I/O interface portion 33, for example, is an HDMI (registered trademark) port, a USB port or the like, and is connected to the information processing apparatus 11 and the like.

Figure 2:
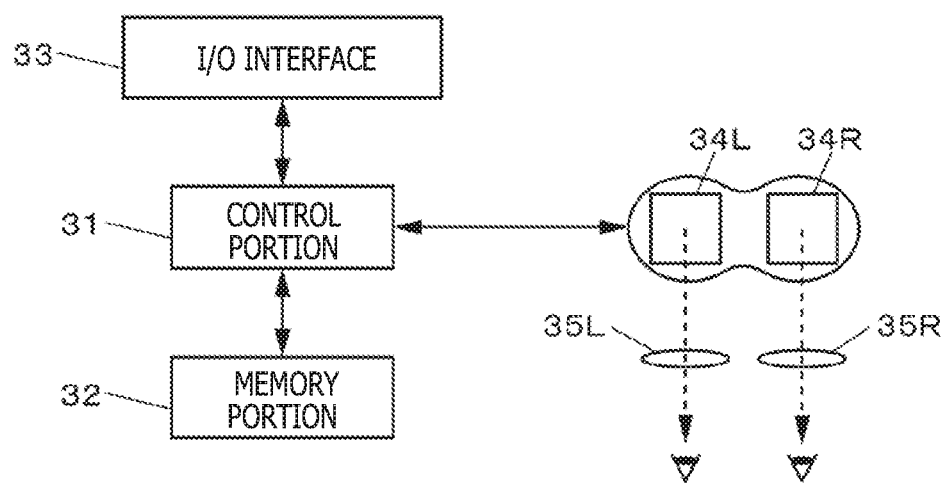
FIG. 2 is a configuration block diagram representing an example of an output apparatus according to the embodiment of the present invention.
Figure 3:
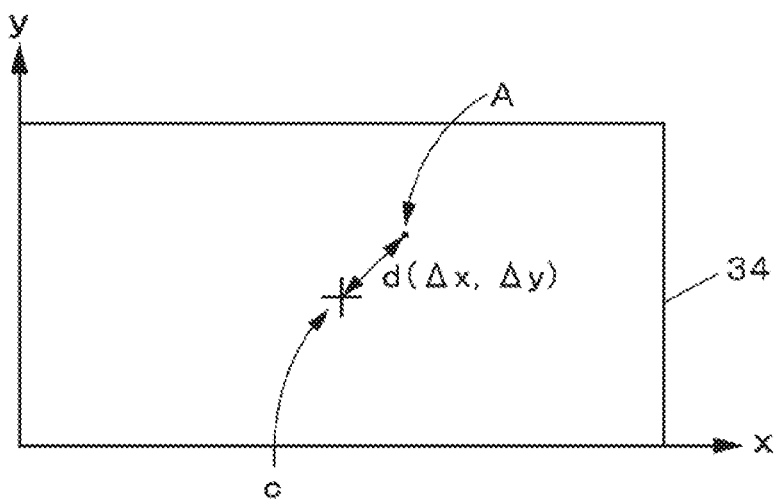
FIG. 3 is an explanatory diagram representing an example of a method of measuring an assembly error of a lens in the output apparatus according to the embodiment of the present invention.

A pair of display portions 34L and 34R, for example, is a liquid crystal display or the like, and, as exemplified in FIG. 2, is provided so as to correspond to each of the left and right eyes of the user (hereinafter, collectively written as the display portion 34 when it is unnecessary to make a distinction). Each of the display portions 34 includes a plurality of pixels 341. Each of the pixels 341 is further provided with sub-pixels 342 which emit light of R, light of G, and light of B. The sub-pixels 342 are arranged in positions as exemplified in FIG. 4(a) or FIG. 4(b) every pixel 341. In this example, a center of a sub-pixel 342r of R is located in a position $(Cx+Rx, Cy+Ry)$ which is $(Rx, Ry)$ apart from a central coordinate $(Cx, Cy)$ of the pixel 342 in both FIG. 4(a) and FIG. 4(b). In addition, a center of a sub-pixel 342g of G is also located in a position $(Cx+Gx, Cy+Gy)$ which is $(Gx, Gy)$ apart from the central coordinate $(Cx, Cy)$ of the pixel 342 in both FIG. 4(a) and FIG. 4(b). On the other hand, a center of a sub-pixel 342b of B is located in a position $(Cx+Bx1, Cy+By1)$ which is $(Bx1, By1)$ apart from the central coordinate $(Cx, Cy)$ of the pixel 342 in FIG. 4(a). In FIG. 4(b), the center of the sub-pixel 342b of B is located in a position $(Cx+Bx2, Cy+By2)$ which is $(Bx2, By2)$ $(Bx1=Bx2$ and $By1 \neq By2$ in the examples of FIGS. 4(a) and 4(b)) apart from the central coordinate $(Cx, Cy)$ of the pixel 342. It should be noted that here, the central coordinate is determined as a point within either the pixel 341 or the sub-pixel 342 in advance like a point at which diagonals of a bounding rectangle of either the pixel 341 or the sub-pixel 342 cross each other.

A pair of lenses 35L and 35R is arranged between the corresponding display portions 34L and 34R, and the eyes of the user who sees the images displayed on the display portions 34L and 34R concerned (that is, a display surface side of the display portion 34) (hereinafter, collectively written as the lens 35 when it is unnecessary to make a distinction). The lens 35 causes a predetermined distortion (for example, a pincushion distortion which contracts in a pincushion shape toward a central portion when a grid surface is displayed) to be generated in an image (an image corresponding to the corrected image data) displayed on the corresponding display portion 34, and causes the eye of the user to recognize the resulting image.

Figure 5:
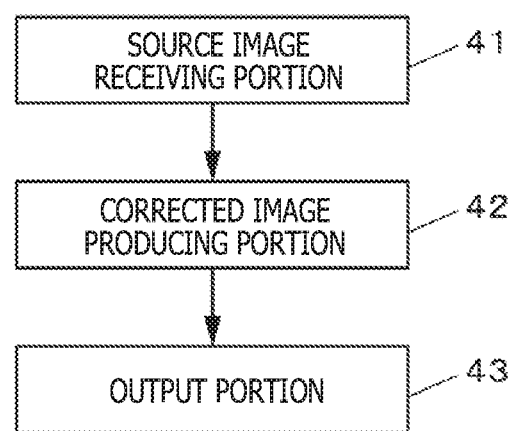
FIG. 5 is a functional block diagram representing an example of an information processing apparatus according to the embodiment of the present invention.

Here, a description will be given with respect to an operation of the control portion 21 of the information processing apparatus 11. The control portion 21, as exemplified functionally in FIG. 5, includes a source image receiving portion 41, a corrected image producing portion 42, and an output portion 42. Here, the source image receiving portion 41 receives inputs of a pair of source image data for the left eye and the right eye. In an example of the present embodiment, the control portion 21 executes processing as well (other pieces of processing), such as processing for a game, different from the correction of the image in parallel (in a time division manner). Thus, the source image receiving portion 41 may also receive the source image data from the other pieces of processing concerned.

The corrected image producing portion 42 subjects each of a pair of source image data to conversion determined by a predetermined conversion expression (for example, an arithmetic expression of conversion for providing a barrel type distortion) for cancelling the distortion of the lens 35, and produces the corrected image data.

Specifically, the corrected image producing portion 42 successively selects the respective pixels constituting the corrected image data with respect to a pair of corrected image data for the left eye and the right eye, and obtains the pixel (the pixel coming out in the position of the pixel, on the corrected image data, selected by the conversion expression) on the source image data corresponding to the pixel on the corrected image data concerned through an arithmetic operation by the information on the position of the selected pixel, and the conversion expression described above. Then, the corrected image producing portion 42 determines the luminance of the selected pixel on the corrected image data, thereby producing the corrected image data based on the pixel value of the corresponding pixel on the source image.

In addition, the corrected image producing portion 42 sends a request for the information on the assembly error to the output apparatus 12, and receives the information on the assembly error which the output apparatus 12 outputs in response to the request concerned to store the information on the assembly error in the memory portion 22. A timing at which the information on the assembly error is obtained may be set at any time as long as the timing is set until before next processing is executed.

The corrected image producing portion 42 reads out the information on the assembly error about the lens 35L and the display portion 34L on the left eye side from the memory portion 22, and moves in parallel the corrected image data on the left eye by an amount corresponding to the information on the error thus read out. That is to say, the corrected image producing portion 42 moves in parallel the whole of the corrected image data for the left eye in such a way that the pixel to be displayed at the center of the display portion 34L of the corrected image data becomes in position the pixel of the display portion 34L on the optical axis of the line of sight of the user visually recognized through the lens 35L.

Thus, the corrected image producing portion 42 obtains second corrected image data for the left eye. In addition, the corrected image producing portion 42 reads out the information on the assembly error about the lens 35R and the display portion 34R on the right eye side from the memory portion 22, and moves in parallel the corrected image data on the left eye by an amount corresponding to the information on the error thus read out. In other words, the corrected image producing portion 42 moves in parallel the whole of the corrected image data for the right eye in such a way that the pixel to be displayed at the center of the display portion 34R of the corrected image data becomes in position the pixel of the display portion 34R on the optical axis of the line of sight of the user visually recognized through the lens 35R. Thus, the corrected image producing portion 42 obtains second corrected image data for the right eye.

The output portion 43 outputs second corrected image data produced in the corrected image processing portion 42.

Operation

The information processing system of the present embodiment includes the configuration described above, and operates as follows.

The control portion 21 of the information processing apparatus 11 sends the request for the information on the assembly error to the output apparatus 12, and receives the information on the assembly error which the output apparatus 12 outputs in response to the request concerned to store the information on the assembly error in the memory portion 22.

Then, the control portion 21 secures an area in which the corrected image data corresponding to a pair of source image data, for the left eye and the right eye, produced in the processing for a game is to be stored in the memory portion 22.

The control portion 21 executes the following processing with respect to each of a pair of corrected image data. That is to say, the control portion 21 successively selects the pixels contained in the corrected image data. The control portion 21 calculates the central coordinate of the selected pixel.

The control portion 21 obtains the coordinate on the source image data which is converted into the central coordinate of the pixel concerned by the conversion expression serving to cancel a distortion of the lens 35 as the corresponding coordinate through the arithmetic operation. Then, the control portion 21 determines the luminance of the selected sub-pixel based on the pixel value (a component of the pixel value corresponding to the color of the selected sub-pixel) in the pixel (there may be a plurality of pixels) falling within a predetermined range with the corresponding coordinates as a center on the source image data. The control portion 21 executes this processing every pixel, thereby obtaining the pixel values of the respective pixels contained in the corrected image data. In addition, the control portion 21 individually executes these pieces of processing with respect to the left eye and the right eye, thereby producing a pair of corrected image data for the left eye and the right eye.

Further, the control portion 21 reads out the information on the assembly error with respect to the lens 35L and the display portion 34L on the left eye side from the memory portion 22, and moves in parallel the corrected image data for the left eye by the amount corresponding to the information on the error thus read out to obtain the second corrected image data for the left eye. In addition, the control portion 21 reads out the information on the assembly error with respect to the lens 35R and the display portion 34R on the right eye side from the memory portion 22, and moves in parallel the corrected image data for the right eye by the amount corresponding to the information on the error thus read out to obtain the second corrected image data for the right eye.

Then, the control portion 21 outputs a pair of second corrected image data thus produced to the output apparatus 12 through the interface portion 23. In the output apparatus 12, the second corrected image data for the left eye thus inputted is displayed on the display portion 34L for the left eye, and the second corrected image data for the right eye thus inputted is displayed on the display portion 34R for the right eye.

These pieces of second corrected image data thus displayed are obtained through such correction as to cancel the distortion of the lens 35 as described above. These pieces of second corrected image data thus displayed suffer the distortion of the lens 35 through the corresponding lenses 35L and 35R, so that the deformation by the correction and the deformation by the distortion cancel each other. Thus, the images corresponding to the source image data enter the eyes of the user. In addition, in this example, even if the display 34 and the lens 35 are arranged off the desired positions at the time of the assembly, the image which is displayed on the display 34 is corrected in such a way that the center of the original source image data is located on the optical axis of the line of sight of the user through the lens 35. Therefore, it is possible to provide the intended sense of perspective for the user.

In the example of the present embodiment, the image (the image represented by the corrected image data) displayed on the display portion 34 of the output apparatus 12 differs in position in units of a pixel every output apparatus 12 in some cases (becomes the same between the output apparatus 12 with which the errors at the time of the assembly agree with each other every corner).

Processing in which it is taken into consideration that central position of sub-pixel and central position of pixel are shifted Moreover, in a certain example of the present embodiment, in carrying out the correction for cancelling the distortion of the lens 35, the corrected image producing portion 42 may execute the processing in which it is taken into consideration that the central position of the sub-pixel and the central position of the pixel are shifted from each other.

Figure 6:
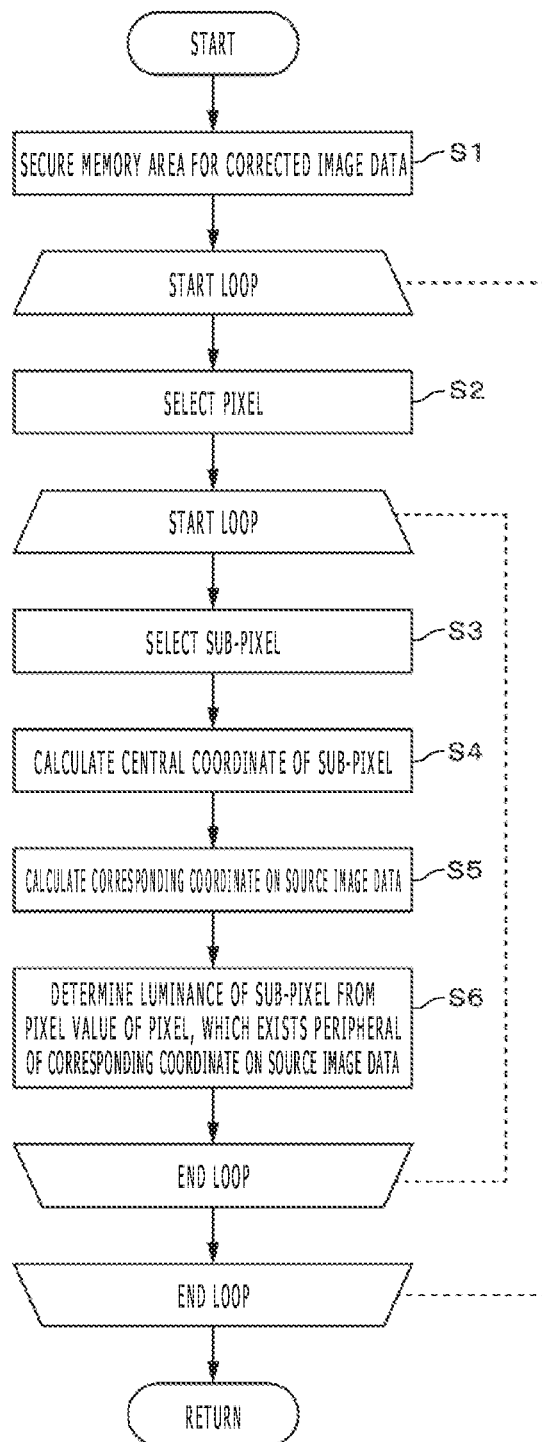
FIG. 6 is a flow chart representing a processing example of the information processing apparatus according to the embodiment of the present invention.

In this case, the processing for producing the corrected image data by the corrected image producing portion 42 is as follows. That is to say, the corrected image producing portion 42 executes next processing for producing the corrected image data with respect to each of a pair of source image data. When the corrected image producing portion 42 starts the processing for producing the corrected image data with respect to any of the source image data, as exemplified in FIG. 6, the corrected image producing portion 42 secures an area in which the corrected image data is to be stored in the memory portion 22 (S1). This area is secured in correspondence to the number of pixels in the display portion 34 of the output apparatus 12.

The corrected image producing portion 42 selects one of the pixels 341 of the corrected image data (S2). It is only necessary that this selection, for example, is carried out in the order of scanning line from the pixel in a top-left corner. In other words, it is only necessary that the pixels are successively selected from the left to the right in a row of the pixels located in the uppermost side, and next, the selection is shifted for next row therebelow (one row therebelow), and the pixels are successively selected from the left to the right again, and so forth. Of course, the selection of the pixels is by no means limited to this order, and the pixels may be selected in the arbitrary order. In addition, by utilizing a GPU, a plurality of pixels is selected in parallel to execute next processing.

When the corrected image producing portion 42 selects one of the pixels 341 corresponding to the corrected image data, the corrected image producing portion 42 successively selects the sub-pixels 342 included in the pixel thus selected (S3). Specifically, it is only necessary to select the sub-pixels in a predetermined order such as an order of R, G, and B. The corrected image producing portion 42 calculates the position of the central coordinate of the sub-pixel 342 selected in the processing S3 by using the central coordinate (Cx, Cy) of the pixel 341 selected in the processing S2 (S4).

If the arrangements of the sub-pixels 342 are identical to one another in all the pixels 341, the central coordinate of the sub-pixel 342 can be calculated by referring to information which represents how much far the central coordinate of each of the sub-pixels 342 is located apart from the central coordinate of the pixel 341 and is stored in the memory portion 22 in advance.

Figure 4:
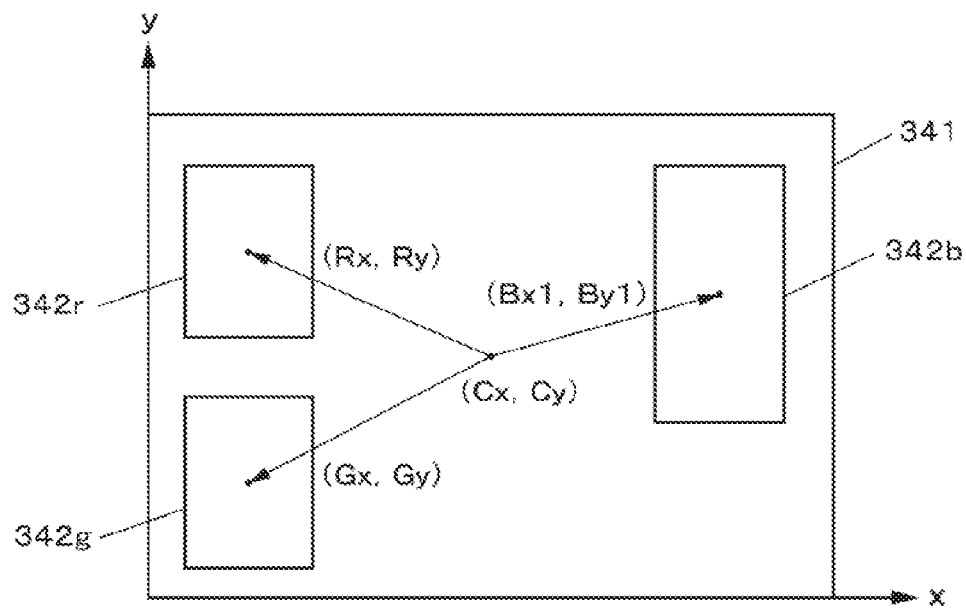
FIG. 4 depicts explanatory diagrams representing an example of arrangement positions of sub-pixels of a display portion of the output apparatus according to the embodiment of the present invention.
Figure 4:
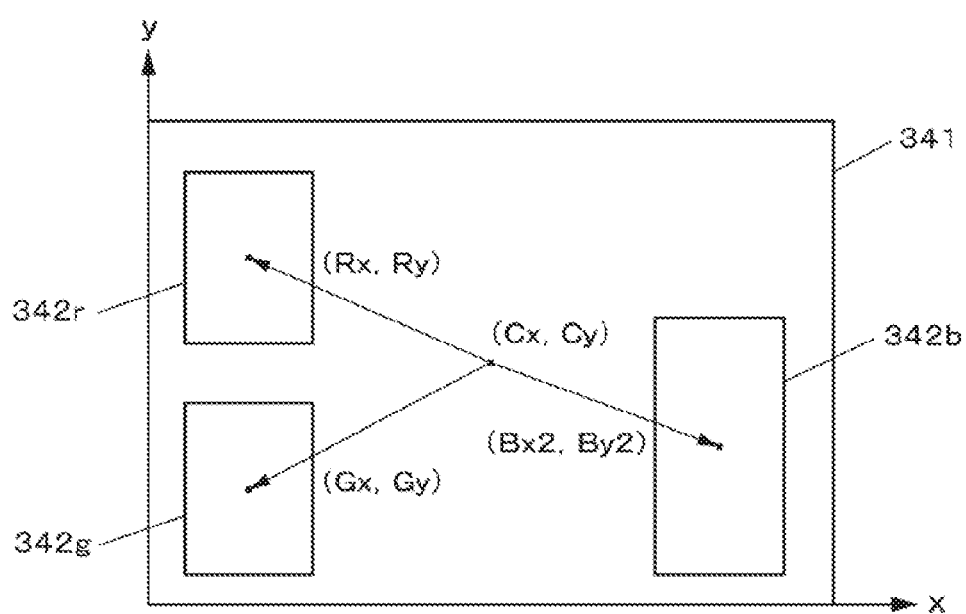

In addition, when the central coordinate of at least one sub-pixel 342 is different depending on the pixels 341 (for example, as exemplified in FIGS. 4(*a*) and 4(*b*), when there are two kinds of arrangements, and so forth), the information representing how much far the central coordinate of each of the sub-pixels 342 is located apart from the central coordinate of the pixel 341 is stored in the memory portion 22. In addition, information specifying the pixel 341 and information representing which kind of arrangement the sub-pixel 342 takes in the pixel 341 specified by that information are stored in the memory portion 22 with being assembled with each other every pixel 341. The corrected image producing portion 42 specifies the kind of arrangement in the pixel 341 selected in the processing S2 based on the information concerned. In addition, the corrected image producing portion 42 calculates the positions of the central coordinates of the respective sub-pixels 342 by referring to the information (the information on the position of the sub-pixel 342 representing how much far the central coordinate of the sub-pixel 342 is located apart from the central coordinate of the pixel 341) on the central coordinates of the respective sub-pixels 342 in the arrangement having the kind thus specified.

Moreover, when the central coordinate of at least one sub-pixel 342 is different depending on the pixel 341 (for example, as exemplified in FIGS. 4(*a*) and 4(*b*), when there are the two kinds of arrangements, and so forth), the information representing how much far the central coordinate of each of the sub-pixels 342 is located apart from the central coordinate of the pixel 341 with respect to each of the pixels 341 may be averaged to obtain the average central coordinate of the respective sub-pixels 342. The resulting average central coordinate of the sub-pixel 342 may be stored in the memory portion 22 in advance. In this case, the corrected image producing portion 42 reads out the information (average information) representing how much far it is located apart from the central coordinate of the pixel 341 selected in the processing S2 from the memory portion 22 and refers to that information, thereby calculating the positions of the central coordinates of the respective sub-pixels 342.

The corrected image producing portion 42 obtains the corresponding coordinate on the source image data, corresponding to the central coordinate of the sub-pixel 342 through the arithmetic operation, calculated in the processing S4 (S5). With that arithmetic operation, the coordinate on the source image data which is converted into the central coordinate of the sub-pixel 342 selected by a predetermined conversion expression is obtained as the corresponding coordinate through the arithmetic operation by using the predetermined conversion expression, cancelling the distortion of lens 35, for obtaining the corrected image data from the source image data, and the central coordinate of the sub-pixel 342 calculated in the processing S4. Since the concrete calculating method is generally known, a detailed description thereof is omitted herein.

The corrected image producing portion 42 determines the luminance of the sub-pixel 342 selected in the processing S3 based on the pixel values (the component of the pixel value corresponding to the color of the sub-pixel 342 selected in the processing S3) in the pixel (there may be a plurality of pixels) falling within the predetermined range on the source image data with the corresponding coordinate on the source image data obtained as the center (S6). For example, when the color of the sub-pixel 342 selected in the processing S3 is R (red), in this case, the luminance of the sub-pixel 342 selected in the processing S3 is determined based on the red color component (the value of R of RGB values) of the pixel value of the pixel falling within a predetermined range on the source image data with the corresponding coordinate on the source image as the center.

In general, the value of the corresponding coordinate obtained from the processing S5 is not located at the center of any of the pixels. Therefore, the determination of the luminance herein is obtained by interpolating the pixel values in the pixels falling within the predetermined range with the resulting corresponding coordinate on the source image data as the center. The interpolations, which are generally known, such as nearest neighbor interpolation, bilinear interpolation, and bicubic interpolation can be used as this interpolation method. As an example, the arithmetic operation relating to the processing S5 and S6 can be carried out by utilizing lens distortion correcting processing using software such as an Open CV.

The corrected image producing portion 42 repeatedly executes the processing from S3 to S6 with respect to the respective sub-pixels 342. As a result, the luminances of the sub-pixels 342 included in the pixel 341 selected in the processing S2 are individually determined, and the pixel value of the pixel 341 concerned is determined. That is to say, in the example of the present embodiment, one of the features is such that the corresponding pixel within the source image data is specified based on the position within the pixel not every pixel, but every sub-pixel, and the luminance of the sub-pixel is determined by using the color component of the sub-pixel of the pixel value of the specified pixel concerned, thereby obtaining the corrected image data.

The corrected image producing portion 42 repeatedly executes the processing from the processing S2 to the processing S6 with respect to the respective pixels 341. As a result, the corrected image producing portion 42 successively obtains the pixel values, of the respective pixels 341, contained in the corrected image data. In addition, the corrected image producing portion 42 executes the processing described above with respect to the left eye and the right eye, thereby producing a pair of corrected image data for the left eye and the right eye.

In the corrected image data produced by the information processing apparatus 11 according to the example of the present embodiment, when the arrangement of the sub-pixels, for example, is one depicted in FIG. 4(a) or FIG. 4(b), since the sub-pixels of R and G are arranged in the longitudinal direction, the arrangement of the sub-pixels is asymmetric with respect to the horizontal line. Therefore, when a pair of images which is symmetric with respect to the horizontal line is made the source image data, the resulting pieces of corrected image data obtained therefrom become the results different from each other. In addition, in this case, although the correction processing for the assembly error of the display and the lens, and the correction processing coping with the position shift between the pixel center and the sub-pixel center are individually executed, these pieces of correction processing may be executed as one correction processing once.

Modified Changes

In the present embodiment, the information on the positions of the sub-pixels within the respective pixels in the display portion 34 of the output apparatus 12 is stored in the memory portion 22. However, the information on the positions of the sub-pixels, for example, may also be stored at the time of installation of the driver of the output apparatus 12.

In another example of the present embodiment, when the output apparatus 12 is connected, the information processing apparatus 11 may acquire the information on the positions of the sub-pixels from the output apparatus 12, and may store the information on the positions of the sub-pixels in the memory portion 22. In this example, the information (either the information representing how much far the central coordinates of the respective sub-pixels 342 are located apart from the central coordinates of the respective pixels 341, or the information representing how much far the central coordinates of the respective sub-pixels 342 are located in average apart from the central coordinates of the pixels 341) representing the positions of the sub-pixels within the pixels in the display portion 34 is stored in the memory portion 32 of the output apparatus 12. That information, for example, is written to the memory portion 32 at the time of the factory shipment or the like.

Then, when the control portion 31 of the output apparatus 12 receives the request for the information on the positions of the sub-pixels from the outside (such as the information processing apparatus 11), the control portion 31 outputs the information on the positions of the sub-pixels stored in the memory portion 32 to the information processing apparatus 11 as the request source in response to the request concerned.

In this example, the information processing apparatus 11 acquires the information on the positions of the sub-pixels from the output apparatus 12 in the stage, before the processing for producing the corrected image data is executed, at the timing at which the output apparatus 12 is connected, or the like, and stores the information on the positions of the sub-pixels in the memory portion 22. The information processing apparatus 11 uses the information on the positions of the sub-pixels in the processing for producing the corrected image data.

Incidentally, even when the information on the positions of the sub-pixels cannot be acquired even if the request is output to the output apparatus 12 in this example, the processing for producing the corrected image data may be executed on the assumption that the central coordinates of all the sub-pixels are located at the centers of the respective pixels of the source image data. In this case, specifically, since the processing for image deformation which has been general in the past can be used, a detailed description is omitted herein.

In addition, in the description until now, when the processing in which the assembly error of the displays or the lenses is taken into consideration is executed, the output apparatus 12 sends the information, on the assembly error of the lens 35, which had been written at the time of the factory shipment to the information processing apparatus 11 in response to the request. However, the present embodiment is by no means limited thereto.

That is to say, in the present embodiment, the output apparatus 12 may be provided with a device for measuring the position shift between the optical axis of the lens 35 and the center of the corresponding display portion 34. Specifically, an auto-collimator which is generally known may be used as this device. Incidentally, in the present embodiment, the measurement of the assembly error may be one for measuring the position shift with respect to an ideal optical axis, or may be one for measuring the relative position shift between the optical axis of the lens and the center of the display portion 34.

In this example, instead of reading out the information on the assembly error stored in the memory portion 32 in response to the request for the information on the assembly error from the outside (such as the information processing apparatus 11), the control portion 31 of the output apparatus 12 measures the position shift between the optical axes of the lenses 35L and 35R, and the centers of the corresponding display portions 34L and 34R, and outputs the information on the assembly error thus measured to the information processing apparatus 11 or the like as the request source.

If such a procedure is adopted, after the factory shipment, for example, when the user drops the output apparatus 12, and so forth to apply the shock to the output apparatus 12, the processing in which the position shift is taken into consideration can be executed even if the display 34 or the lens 35 is shifted in position.

REFERENCE SIGNS LIST

10 Information processing system, 11 Information processing apparatus, 12 Output apparatus, 21, 31 Control portion, 22, 32 Memory portion, 23 Interface portion, 33 I/O interface portion, 34 Display portion, 35 Lens, 41 Source image receiving portion, 42 Corrected image producing portion, 43 Output portion, 341 Pixel, 342 Sub-pixel.

The invention claimed is:

1. An information processing system comprising:
a head-mounted display; and
an information processing apparatus,
the head-mounted display including:
a display portion including a plurality of sub-pixels every pixel,
a lens arranged on a display surface side of the display portion, the lens including an inherent distortion, and
a circuit operating to output information on an assembly error representing a fixed position shift between an optical axis of the lens and a center of the display portion measured at a time of manufacturing the head-mounted display,
the information processing apparatus serving to acquire the information on the assembly error from the head-mounted display, and the information processing apparatus including:
a corrected image data producing circuit operating to: (i) produce first corrected image data from source image data such that the first corrected image data compensates for the inherent distortion of the lens, and (ii) produce second corrected image data from the first corrected image data by moving the first corrected image data an equal and opposite shift as the fixed position shift based on the information on the assembly error acquired, and
a circuit operating to output the second corrected image data produced by the corrected image data producing circuit to the head-mounted display,
wherein the head-mounted display displays the second corrected image data output from the information processing apparatus on the display portion.

2. An information processing apparatus operable for communicating with a head-mounted display, including a display portion including a plurality of sub-pixels every pixel, a lens arranged on a display surface side of the display portion, the lens including an inherent distortion, and the head-mounted display outputting information on an assembly error representing a fixed position shift between an optical axis of the lens and a center of the display portion measured at a time of manufacturing the head-mounted display, the information processing apparatus serving to produce an image to be displayed on the display portion, and the information processing apparatus comprising:
a corrected image data producing circuit operating to: (i) produce first corrected image data from source image data such that the first corrected image data compensates for the inherent distortion of the lens, and (ii) produce second corrected image data from the first corrected image data by moving the first corrected image data an equal and opposite shift as the fixed position shift based on the information on the assembly error acquired; and
a circuit operating to output the second corrected image data produced by the corrected image data producing circuit to the head-mounted display.

3. The information processing apparatus according to claim 2, further comprising:
a memory operating to store information on the assembly error, representing the position shift between the optical axis of the lens and the center of the display portion, obtained through measurement,
wherein the circuit operating to output outputs the information on the assembly error stored in the memory.

4. The information processing apparatus according to claim 2, further comprising:
a measurement circuit operating to measure the assembly error representing the position shift between the optical axis of the lens and the center of the display portion,
wherein the circuit operating to output outputs the information on the assembly error measured by the measurement circuit.

5. A non-transitory, computer readable recording medium storing a computer program, which when executed by an information processing apparatus, causes the information processing apparatus to carry out actions, where the information processing apparatus is operable for communicating with a head-mounted display, including a display portion including a plurality of sub-pixels every pixel, a lens arranged on a display surface side of the display portion, the lens including an inherent distortion, and the head-mounted display outputting information on an assembly error representing a fixed position shift between an optical axis of the lens and a center of the display portion measured at a time of manufacturing the head-mounted display, the information processing apparatus serving to produce an image to be displayed on the display portion, the actions, comprising:

producing first corrected image data from source image data such that the first corrected image data compensates for the inherent distortion of the lens, producing second corrected image data from the first corrected image data by moving the first corrected image data an equal and opposite shift as the fixed position shift based on the information on the assembly error acquired; and outputting the second corrected image data produced by the corrected image data producing means to the head-mounted display.

* * * * *